(12) United States Patent
Sachs et al.

(10) Patent No.: US 8,825,053 B2
(45) Date of Patent: Sep. 2, 2014

(54) TECHNIQUE FOR INSTRUCTING MOBILE STATIONS COMMUNICATING WITH COOPERATING ACCESS NODES

(75) Inventors: Joachim Sachs, Stockholm (SE); Laetitia Falconetti, Aachen (DE); Christian Hoymann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 308 days.

(21) Appl. No.: 13/319,889

(22) PCT Filed: May 11, 2009

(86) PCT No.: PCT/EP2009/003327
§ 371 (c)(1),
(2), (4) Date: May 1, 2012

(87) PCT Pub. No.: WO2010/130268
PCT Pub. Date: Nov. 18, 2010

(65) Prior Publication Data
US 2012/0202498 A1 Aug. 9, 2012

(51) Int. Cl.
*H04W 36/00* (2009.01)
*H04W 28/16* (2009.01)
(52) U.S. Cl.
CPC .................................. *H04W 28/16* (2013.01)
USPC ........ 455/436; 455/422.1; 370/431; 370/331; 370/332
(58) Field of Classification Search
USPC .................. 455/436, 422; 370/332, 331, 431
See application file for complete search history.

(56) References Cited

U.S. PATENT DOCUMENTS

| | | | |
|---|---|---|---|
| 6,141,559 A | 10/2000 | Neumiller et al. | |
| 6,230,014 B1 * | 5/2001 | Freeze et al. | 455/442 |
| 6,341,222 B1 * | 1/2002 | Neumiller et al. | 455/422.1 |
| 8,219,095 B2 * | 7/2012 | Stephens | 455/436 |
| 8,553,711 B2 * | 10/2013 | Borran et al. | 370/431 |
| 2009/0111473 A1 | 4/2009 | Tao et al. | |
| 2009/0135966 A1 * | 5/2009 | Fischer et al. | 375/341 |
| 2010/0046477 A1 * | 2/2010 | Marin et al. | 370/332 |
| 2010/0189074 A1 * | 7/2010 | Liao | 370/331 |

FOREIGN PATENT DOCUMENTS

| | | |
|---|---|---|
| GB | 2452794 A | 3/2009 |
| WO | 2005060277 A2 | 6/2005 |

* cited by examiner

*Primary Examiner* — David Q Nguyen
(74) *Attorney, Agent, or Firm* — Coats & Bennett, P.L.L.C.

(57) ABSTRACT

A technique for instructing at least one mobile station communicating with a serving access node, the serving access node being capable of cooperating with a plurality of supporting access nodes and the at least one mobile station being capable of additionally communicating with the plurality of supporting access nodes is provided. A method implementation of this technique comprises the steps of obtaining at least one backhaul parameter relating to a backhaul capacity of at least one of the serving access node and a supporting access node, generating at least one of a handover command and a system information parameter based on the obtained at least one backhaul parameter, and providing the at least one of the handover command and the system information parameter to the at least one mobile station.

19 Claims, 10 Drawing Sheets

TECHNIQUE FOR INSTRUCTING MOBILE STATIONS COMMUNICATING WITH COOPERATING ACCESS NODES

TECHNICAL FIELD

The present invention generally relates to the field of mobile communication networks comprising a plurality of access nodes which are capable of cooperating with to each other. In particular, the invention relates to a technique for instructing at least one mobile station communicating with a serving access node, the serving access node being capable of cooperating with a plurality of supporting access nodes and the at least one mobile station being capable of additionally communicating with a plurality of supporting access nodes.

BACKGROUND

In cellular mobile communication networks, simultaneous transmission over air interfaces using the same physical resources frequently occurs. Thereby, co-channel interference is caused which reduces the signal quality of transmission signals. This in turn reduces the transmission capacity of the mobile communication network. Co-channel interference becomes even more critical in mobile communication networks having a dense deployment of access nodes.

Cooperation of access nodes is a possibility to increase the signal quality of transmission signals and the transmission capacity of a mobile communication network. For access node cooperation, an initial communication between an access node (a so called "serving access node") and a mobile station is extended in that the mobile station additionally communicates via at least one further access node (a so called "supporting access node"). Thereby, the serving access node additionally uses the transmission and receiving capacities of the at least one supporting access node for communicating with the mobile station. For using the additional transmission and receiving capacities, user data, control data and data for operation and maintenance (O&M) has to be exchanged between the serving access node and the at least one supporting access node (e.g., via a core network).

However, the transport links connecting the serving access node and the at least one supporting access node may not have sufficient transport link capacity for transmitting the required user data, control data and data for O&M between the serving access node and the at least one supporting access node. In case of distant access nodes, the transport link can, for example, be realized as a leased wired telephone line having a transport link capacity of about 2 Mbps, a wireless microwave link having a transport capacity of several tens of Mbps, a wired Digital Subscriber Line (DSL) connection having a transport capacity of several hundreds of Mbps, or a wired fibre connection having a transport capacity of several thousands of Mbps. In case of co-located access nodes, the transport link might, for example, be a computer bus running on the backplane of a server rack connecting two processing units. Due to the limited bandwidth of such or similar transport links, sometimes not sufficient user data, control data and data for O&M can be transported between the serving access node and the at least one supporting access node so that the access nodes cannot cooperate with each other.

Thus, for access nodes cooperating or intending to cooperate with each other in order to serve at least one mobile station, the problem of limited transport link capacity on the network path between the access nodes arises.

SUMMARY

Accordingly, there is a need for a technique for instructing at least one mobile station communicating with a serving access node which is capable of cooperating with a plurality of supporting access nodes, which is avoiding at least some of the disadvantages outlined above.

This need is satisfied according to a first aspect by a method for instructing at least one mobile station communicating with a serving access node, the serving access node being capable of cooperating with a plurality of supporting access nodes and the at least one mobile station being capable of additionally communicating with the plurality of supporting access nodes. The method comprises the steps of obtaining at least one backhaul parameter relating to a transport link capacity of at least one of the serving access node and a supporting access node, generating at least one of a handover command and a system information parameter based on the obtained at least one backhaul parameter, and providing the at least one of the handover command and the system information parameter to the at least one mobile station.

The backhaul capacity is the transport link capacity of at least one transport link on the network path between the serving access node and at least one supporting access node (e.g., a communication link between any two network components). For example, the backhaul capacity may be the transport link capacity of a transport link connecting the serving access node and any neighbouring network component. However, the backhaul capacity may also be the transport link capacity of a plurality of (e.g., serially arranged) transport links or a complete transport link between the serving access node and one or a plurality of supporting access nodes. Accordingly, the backhaul parameter is a parameter relating to the transport link capacity of any transport link providing a connection between the serving access node and at least one supporting access node. Based on the obtained at least one backhaul parameter, at least one of a handover command and a system information parameter is generated.

The mobile station may be any mobile communication device like a mobile telephone, a Personal Digital Assistant (PDA), a network card or any other mobile communication apparatus which is capable of communicating via an air interface with an access node.

The access node may be any kind of network component which is capable of communicating from the network side with a mobile station. The access node may constitute a cell, cover the cell area of the cell, and serve all mobile stations associated with the cell. The access node may for example be an eNodeB or a base station being deployed in a mobile communication network working according to the $3^{rd}$ Generation Partnership Project (3GPP) Long Term Evolution (LTE) standard. The access node may also be a section of an eNodeB or a base station constituting a cell. Such a section may comprise one or more antennas, RF-parts such as filters, power-amplifiers and/or low-noise amplifiers, and signal processing means. Access node cooperation may be achieved via at least two access nodes, e.g., at least one of a first base station and a second base station, and a first section of a first base station and a second section of the same base station or a second base station. Base-station-to-base-station-cooperation may also be denoted as inter-base-station cooperation and section-to-section-cooperation of the same base station may also be denoted as intra-base-station cooperation. Accordingly, eNodeB-to-eNodeB -cooperation may also be denoted as inter-eNodeB cooperation and section-to-section-cooperation of the same eNodeB may also be denoted as intra-eNodeB cooperation.

The handover parameter may be a parameter triggering a mobile station to initiate a handover procedure, in particular a handover from one access node to another access node, i.e., to change the serving access node. In case the mobile station is served by a serving access node having a limited backhaul capacity, the mobile station may handover to another access node (which acts as the new serving access node) having more backhaul capacity available so that cooperation of the new serving access node with at least one supporting access node is possible.

Additionally, or in the alternative, the system information parameter may be a threshold value indicating to the at least one mobile station until which signal quality level to camp on the serving access node. In idle mode, a mobile station usually camps on a first access node providing the best signal quality. When the signal quality deteriorates, the mobile station may camp on a second access node providing a better signal quality. However, the second access node may not have a better backhaul capacity than the first access node so that cooperation with supporting access nodes may not be possible in case the second access node becomes a serving access node when changing from idle mode to active mode. Accordingly, the threshold value may be provided by the first access node to the mobile station indicating to the mobile station to camp longer, i.e., until a higher decrease of signal quality beyond the threshold value, on the first access node. Thus, the first access node may influence how long the mobile station camps on a certain access node, i.e., influence cell selection, cell reselection and idle mode mobility.

As a further alternative, or additionally, the system information parameter may also be a cell status parameter including at least one access category for the at least one mobile station. The cell status parameter may limit the number of mobile stations which are served by an access node. For example, the cell status parameter may include an access category which blocks mobile stations from a certain network operator from communicating with an access node. Furthermore, random access by a mobile station (i.e., after being paged) may be blocked or a mobile station may not be allowed to be served by a certain access node. For this, the serving access node may send the cell status parameters to the mobile station. The cell status parameter may also include information relating to a backhaul capacity of an access node or cooperation capabilities of at least one access node. Accordingly, based on the cell status parameter including at least one access category, an access node can influence whether a mobile station is served by an access node having a limited backhaul capacity.

The system information parameter may also be a threshold value indicating to the at least one mobile station a number of supporting access nodes for the additional communication with the at least one mobile station. The threshold value may for example be compared with a difference between a signal quality level of a serving access node and a signal quality level of a supporting access node. By varying the threshold value, it is possible to influence the number of supporting access nodes which are in addition to the serving access node at the same time communicating with the at least one mobile station, i.e., the amount of cooperation between access nodes. Thus, in case a serving access node has enough free backhaul capacity available, the amount of cooperation between access nodes may be increased.

In order to decide whether a handover to another access node or a cooperation with another access node is possible or provides advantages with regard to the radio access capacity of a served mobile station, the method may comprise the steps of comparing the at least one backhaul parameter with a parameter relating to a backhaul capacity of a supporting access node and providing the at least one of the handover command and the system information parameter to the at least one mobile station based on the comparison result. The at least one backhaul parameter may also be compared with a parameter relating to a backhaul capacity of a plurality of supporting access nodes or all access nodes deployed in a mobile communication network or a certain network area so that an overview about candidates for handover and/or access node cooperation may be determined. The determined data may be stored in a data base.

In order to decrease the amount of calculation and comparison for the instruction of the at least one mobile station, access nodes which are not capable of communicating with the at least one mobile station may be excluded from a determination and comparison of backhaul parameters. Accordingly, the method may comprise the further steps of determining supporting access nodes which are capable of communicating with the at least one mobile station, obtaining the backhaul parameters for the determined supporting access nodes, comparing the obtained backhaul parameters, and providing the at least one of the handover command and the system information parameters to the at least one mobile station based on the comparison result of the obtained backhaul parameters. In other words, according to this aspect, only supporting access nodes which are capable of communicating with the at least one mobile station are considered for further processing, thereby decreasing the amount of data to be considered for the instruction of the at least one mobile station.

To further decrease the amount of data to be considered and processed for the instruction of the at least one mobile station (i.e., for the comparison of different backhaul parameters), supporting access nodes having a limited free backhaul capacity may be excluded from further consideration for handover or access node cooperation. For this, the method may comprise the further steps of determining supporting access nodes having a limited free backhaul capacity and excluding the determined supporting access nodes from the additional communication with the at least one mobile station. Thereby, the required processing power for the comparisons of backhaul parameters can be reduced.

For determining whether a handover to another access node or a cooperation with another access node is beneficial with regard to the radio access rate of the at least one mobile station, the method may comprise the further steps of obtaining at least one potential radio access rate of the at least one mobile station when at least one of being served by another serving access node and communicating with at least one supporting access node which is cooperating with the serving access node applies, obtaining an actual radio access rate of the at least one mobile station, comparing the at least one potential radio access rate with the actual radio access rate, and providing the at least one of the handover command and the system information parameter to the at least one mobile station based on the comparison result of the at least one potential radio access rate with the actual radio access rate.

It is also possible that potential radio access rates for a plurality of mobile stations are determined when at least one of being served by another serving access node and communicating with at least one supporting access node which is cooperating with a serving access node applies, and that these potential radio access rates are compared with actual radio access rates. Thereby, a complete overview (e.g., in a data base) regarding the radio access rates of a plurality of mobile stations and access nodes in a mobile communication network or an area of a mobile communication network can be obtained. Moreover, it can be individually determined for each mobile station whether a handover to another access node or a communication with an additional access node is beneficial. It can also be determined whether a change of a supporting access node or a cooperation of a serving access node with certain supporting access nodes is beneficial. Accordingly, the overall performance of a mobile communication network can be optimized.

Depending on the physical structure of the mobile communication network, the kind of transport link provided to an access node, the amount of access node cooperation and the user behaviour, different access node cooperation techniques may be more or less beneficial with regard to the radio access rate of the at least one mobile station. Thus, the method may comprise the further step of selecting an access node cooperation technique used by the serving access node based on the at least one backhaul parameter. The selection may be provided during network planning, during initial start-up of the network or the access node or during network operation. The selection during initial start-up of the network or the access node may be automatically provided by the network or the access node.

In order to provide a precise decision criteria with regard to the kind of access node cooperation technique used for an access node, the method may comprise the further steps of determining a parameter relating to a used transport capacity of a transport network connecting the serving access node with at least one supporting access node and selecting the access node cooperation technique based on the determined parameter relating to an unused transport capacity. In particular, some access node cooperation techniques require a high amount of transport link capacity and some access node cooperation techniques only require a low amount of transport link capacity. Accordingly, depending on the unused transport link capacity of the transport network, the kind of access node cooperation technique may be individually selected.

For determining whether a handover and/or an access node cooperation is advantageous with regard to the radio access rate of the at least one mobile station, the method may comprise the further steps of receiving at least one first parameter relating to a radio link quality of the serving access node, receiving at least one second parameter relating to a radio link quality of at least one supporting access node, and providing the at least one of the handover command and the system information parameter to the at least one mobile station based on the received first and second parameters. The radio link quality values may be determined by the at least one mobile station (e.g., via signal strength measurements) and sent to the serving access node for evaluation. Thus, the serving access node can obtain an overview about the radio link qualities of all access nodes being able to communicate with the at least one mobile station.

In an effort to provide a further decision criteria with regard to initiating a handover and/or access node cooperation, the method may comprise the further steps of determining at least one of a parameter relating to a threshold of difference in signal quality between the serving access node and a supporting access node, a parameter relating to the signal quality of the serving access node, a parameter relating to the Quality of Service (QoS) of the mobile station, and a parameter relating to a subscriber profile of the mobile station, and providing the at least one of the handover command and the system information parameter to the at least one mobile station dependent on the determined parameters.

For improving the radio access rates of more than one mobile station, the method may comprise the further steps of obtaining backhaul parameters for a plurality of access nodes and providing the at least one of the handover command and the system information parameter to selected ones of the plurality of mobile stations dependent on the obtained backhaul parameters. According to this aspect, an overview (e.g., in a data base) regarding the backhaul capacities of a plurality of access nodes may be obtained. Based on the obtained data, handover and/or cooperation with additional access nodes is only initiated for selected ones of the plurality of mobile stations. Thus, the radio access rates may be individually optimized.

To avoid that too frequent handovers or too frequent changes of cooperating access nodes occur (which causes an overall decrease of the radio access rate, e.g., by a ping-pong effect), a hysteresis margin may be taken into consideration for providing the at least one of the handover command and the system information parameter to the at least one mobile station.

Free backhaul capacity may change rapidly during network operation, in particular due to the communication and download behaviour of subscribers. In order to avoid a backhaul capacity overload situation (e.g., when taking unused transport capacity of the transport network into consideration), a safety margin may be added to the at least one backhaul parameter. Thus, in case unused transport link capacity decreases within a short period of time, radio link failures can be prevented.

According to another aspect, a computer program product is provided. The computer program product comprises program code portions for performing one or more of the steps of one or more of the method aspects described herein when the computer program product is executed on one or more computing devices. The computer program product may be stored on a computer-readable recording medium such as a permanent or re-writeable memory, a CD-ROM, or a DVD. The computer program product may also be provided for download via one or more computer networks, such as the Internet, a cellular telecommunications network or a wireless or wired Local Area Network (LAN).

As for a first hardware aspect, an access node capable of communicating with at least one mobile station and cooperating with a plurality of supporting access nodes which are capable of additionally communicating with the at least one mobile station is provided. The access node comprises an obtaining unit for obtaining at least one backhaul parameter relating to a backhaul capacity of at least one of the access node and a supporting access node, a generating unit for generating at least one of a handover command and a system information parameter based on the obtained at least one backhaul parameter, and a sending unit for providing the at least one of the handover command and the system information parameter to the at least one mobile station. The access node may further comprise a comparing unit for comparing the at least one backhaul parameter with a parameter relating to a backhaul capacity of a supporting access node.

As for a second hardware aspect, a mobile communication network is provided. The mobile communication network comprises at least one access node capable of communicating with at least one mobile station and cooperating with a plurality of supporting access nodes, and at least one supporting access node capable of cooperating with the at least one access node. The mobile communication network may for example be a 3GPP LTE network.

BRIEF DESCRIPTION OF THE DRAWINGS

In the following, the invention will be described with reference to exemplary embodiments illustrated in the drawings, wherein.

DESCRIPTION OF PREFERRED EMBODIMENTS

In the following, for purposes of explanation and not limitation, specific details are set forth, such as particular sequences of steps, components and configurations, in order to provide a thorough understanding of the present invention. It will be apparent to one skilled in the art that the present invention may be practiced in other embodiments that depart from these specific details. For example, while the embodiments will be described with reference to mobile communication networks and mobile stations which are working according to the 3GPP LTE standard, it will be apparent to the skilled person that the invention can also be practiced in context with mobile communication networks and mobile stations which are working in accordance with other mobile communication standards.

Moreover, those skilled in the art will appreciate that the functions and processes explained herein below may be implemented using software functioning in conjunction with a programmed microprocessor or with general purpose computers. It will also be appreciated that while the embodiments are primarily described in the form of methods and apparatuses, the invention may also be embodiment in a computer program product as well as in a system comprising a computer processor and a memory coupled to the processor, wherein the memory is encoded with one or more programs that may perform the functions disclosed herein.

Figure 1:
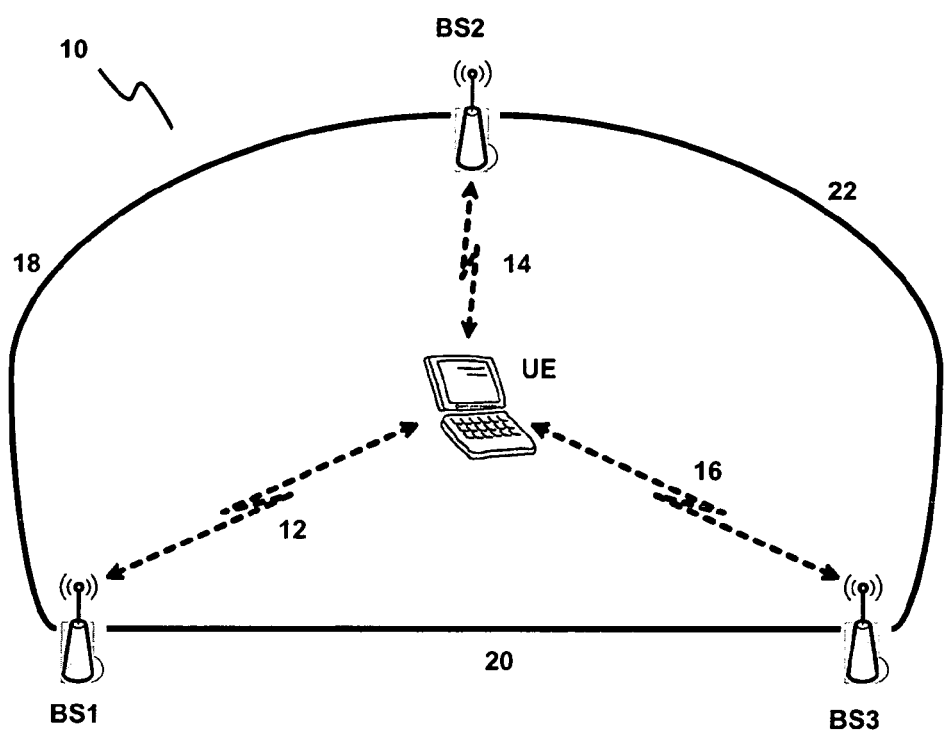
FIG. 1 is a schematic diagram showing a first embodiment of a mobile communication network having a plurality of cooperating access nodes.

FIG. 1 shows a schematic block diagram illustrating a first embodiment of a mobile communication network having a plurality of cooperating access nodes. The mobile communication network 10 is a 3GPP LTE network and comprises three access nodes BS1, BS2 and BS3 which are communicating via air interfaces 12, 14, 16 with a mobile station UE. Access nodes BS1, BS2 and BS3 may for example be base stations or eNodeBs. Access node BS1 is a serving access node for mobile station UE and access nodes BS2 and BS3 are supporting access nodes. Access nodes BS1, BS2 and BS3 are cooperating with each other, i.e., serving access node BS1 is additionally using supporting access nodes BS2 and BS3 for communicating with mobile station UE.

For the cooperation between access nodes BS1, BS2 and BS3, user data, control data and data for O&M is exchanged between serving access node BS1 and supporting access nodes BS2 and BS3 via transport links 18, 20, 22. Transport links 18, 20, 22 are shown in FIG. 1 as direct connecting lines, however, the connections may also be provided via one or more intermediate network entities of, for example, a core network (not shown).

Figure 2:
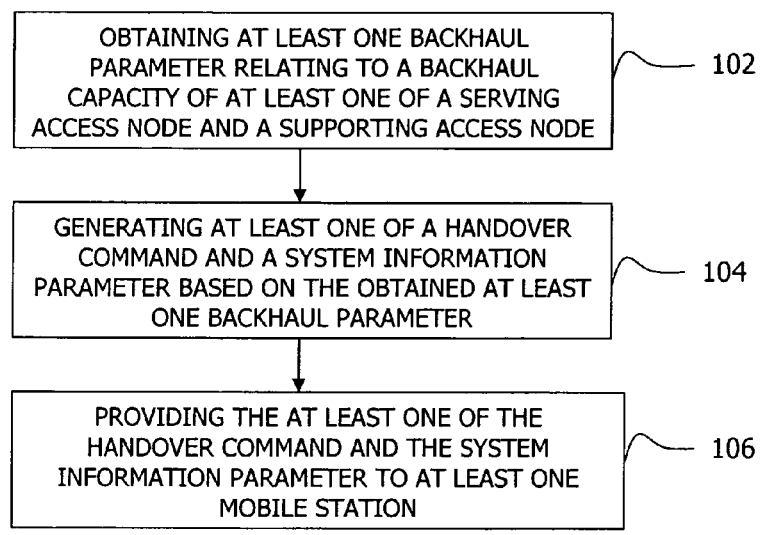
FIG. 2 is a flow chart showing a first embodiment of a method for instructing at least one mobile station communicating with a serving access node.

FIG. 2 shows a flow chart 100 illustrating an embodiment of a method for instructing at least one mobile station communicating with a serving access node. The method will be explained with reference to the mobile communication network 10 of FIG. 1.

The method 100 starts in step 102 in that the serving access node BS1 obtains at least one backhaul parameter relating to a backhaul capacity of at least one of the serving access node BS1 and a supporting access node BS2, BS3. In the embodiment according to FIG. 1, the backhaul capacities are the transport link capacities of the transport links 18, 20, 22 connecting the access nodes. For example, the backhaul capacity of serving access node BS1 is the transport link capacity of transport links 18 and 20, the backhaul capacity of supporting access node BS2 is the transport link capacity of transport links 18 and 22, and the backhaul capacity of supporting access node BS3 is the transport link capacity of transport links 20 and 22. Accordingly, in step 102, at least one backhaul parameter relating to at least one of these backhaul capacities is obtained.

In a subsequent step 104, at least one of a handover command and a system information parameter is generated based on the at least one backhaul parameter obtained in step 102. Thereafter, in step 106, the at least one of the handover command and the system information parameter is provided by access node BS1 to mobile station UE.

For example, in case it has been determined that the backhaul capacity of serving access node BS1 is low and that the backhaul capacity of supporting access node BS2 is high, a handover command may be sent by serving access node BS1 to mobile station UE triggering mobile station UE to handover from access node BS1 to access node BS2 (so that access node BS2 becomes the new serving access node).

As a further example, in case mobile station UE is in idle mode and camps on access node BS1, the signal quality of access node BS1 may get lower than the signal quality of access node BS2. However, from the backhaul parameter of access node BS2, access node BS1 knows that access node BS2 is due to limited backhaul capacity no candidate for cooperation. Therefore, access node BS1 sends a system information parameter to mobile station UE. The system information parameter is a threshold value indicating to mobile station UE until which signal quality level to camp on access node BS1. Thus, mobile station UE camps longer on access node BS1 although access node BS2 provides a better signal quality.

The system information parameter provided by access node BS1 to mobile station UE may also be a cell status parameter including at least one access category for the mobile station UE or a further threshold value indicating to mobile station UE a number of supporting access nodes BS2, BS3 for additional communication.

Figure 3:
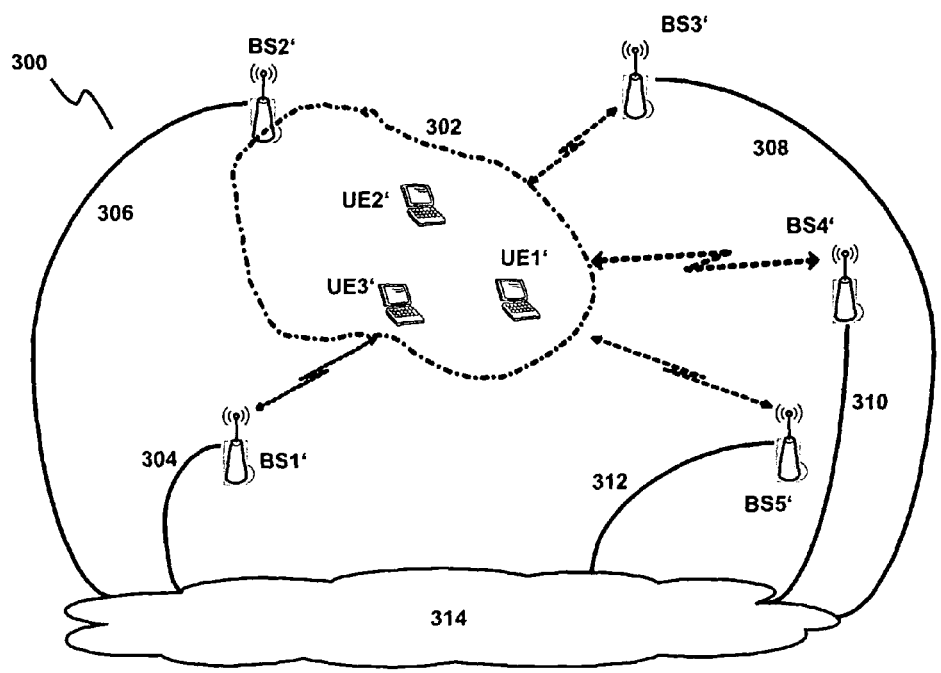
FIG. 3 is a schematic block diagram showing a second embodiment of a mobile communication network having a plurality of cooperating access nodes.

FIG. 3 shows a schematic block diagram illustrating a second embodiment of a mobile communication network having a plurality of cooperating access nodes. Within the mobile communication network 300, five access nodes BS1', BS2', BS3', BS4' and BS5' are deployed. Access nodes BS1', BS2', BS3', BS4' and BS5' may for example be base stations or eNodeBs. Three mobile stations UE1', UE2' and UE3' are located in the coverage area 302 of access nodes BS1', BS2', BS3', BS4' and BS5'. Accordingly, all access nodes BS1', BS2', BS3', BS4' and BS5' are principally capable of communicating with each of mobile stations UE1', UE2' and UE3'.

Access nodes BS1', BS2', BS3', BS4' and BS5' exchange via transport links 304, 306, 308, 310, 312 and core network 314 information regarding their backhaul capacities. Transport links 304, 306, 308, 310, 312 are the backhaul links of access nodes BS1', BS2', BS3', BS4' and BS5'. The information exchanged between the access nodes BS1', BS2', BS3', BS4' and BS5' can be information regarding the maximum transport link capacity of each access node BS1', BS2', BS3', BS4' and BS5', the type of transport links 304, 306, 308, 310, 312 employed (e.g., copper, optical fibre, microwave, or server backplane) and/or the current utilization of backhaul links 304, 306, 308, 310, 312 (e.g., measured in a percentage). Access nodes BS1', BS2', BS3', BS4' and BS5' may also exchange information regarding an amount of unused backhaul capacity (e.g., in Mbps).

It is also possible that information regarding whether the access nodes BS1', BS2', BS3', BS4' and BS5' are capable of cooperatively serving another mobile stations is exchanged (e.g., a single bit in a data packet may indicate whether a transport link 304, 306, 308, 310, 312 is busy or not). The information may be exchanged as backhaul capacity measurement reports.

The information regarding backhaul capacities may be directly exchanged between access nodes BS1', BS2', BS3', BS4' and BS5' via transport links 304, 306, 308, 310, 312 and core network 314. For example, in case the mobile communication network 300 is a network working in accordance with the 3GPP LTE standard, the information may be exchanged via an X2 interface. However, the information may also be indirectly exchanged using a central controller or via an operation and maintenance system.

Mobile stations UE1', UE2' and UE3' determine radio link quality values of access nodes BS1', BS2', BS3', BS4' and BS5'. In particular, mobile stations UE1', UE2' and UE3' determine radio link quality values for all access nodes BS1', BS2', BS3', BS4' and BS5' with which they are communicating. For this, mobile stations UE1', UE2' and UE3' carry out signal strength measurements. Thereafter, the mobile stations UE1', UE2' and UE3' send the determined radio link quality values to its respective serving access nodes.

Based on the backhaul parameters received from access nodes BS1', BS3', BS4' and BS5', access node BS2' determines that all mobile stations UE1', UE2' and UE3' would generally benefit from access node cooperation, i.e., the downlink and/or uplink capacity of mobile stations UE1', UE2' and UE3' could increase.

However, the backhaul capacity of transport link 306 of access node BS2' is limited (i.e., not enough free transport link capacity is available) so that user data, control data and data for O&M data necessary for access node cooperation cannot be sent to other access nodes. Accordingly, access node BS2' searches for other access nodes which can act as serving and/or supporting access nodes.

From the exchanged backhaul capacities, access node BS2' determines that access nodes BS1', BS3', BS4' and BS5' could principally act as serving and/or supporting access node for mobile station UE1', that access node BS1' could principally act serving and/or supporting access node for mobile station UE2', and that access nodes BS1' and BS5' could principally act as serving and/or supporting access node for mobile station UE3'. The above information is stored in a candidate list.

Based on the exchanged backhaul capacities, access node BS2' removes in a next step those access nodes not having enough backhaul capacity from the candidate list (i.e., from being a candidate for acting as a serving and/or supporting access node). Since backhaul link 304 of access node BS1' is a leased telephone line, only a limited transport link capacity is provided. Therefore, access node BS2' removes access node BS1' from the candidate list. Accordingly, access node BS1' is not further considered by access node BS2' for acting as a serving and/or supporting access node.

Thus, the updated candidates for mobile station UE1' are access nodes BS3', BS4' and BS5', for mobile station UE3' is access node BS5', and no candidate access node exists for mobile station UE2'.

Based on the radio link quality values sent by mobile stations UE1', UE2' and UE3' to access node BS2', access node BS2' calculates for each of mobile stations UE1', UE2' and UE3' the potential radio access rates when cooperating with other access nodes indicated in the candidate list.

The determined and calculated radio access rates are shown in the following table 1:

| Mobile stations | Radio access rates BS2' (no cooperation) | Radio access rates BS2' (potential cooperation) |
|---|---|---|
| UE1' | 1 Mbps | 3 Mbps |
| UE2' | 3 Mbps | — |
| UE3' | 2 Mbps | 1 Mbps |

The calculated potential radio access rates are compared with the actual radio access rate of access node BS2' (i.e., when access node BS2' is not cooperating with another access node). As can be seen from table 1, mobile station UE1' could be served by access node BS3' acting as a serving access node and access nodes BS4' and BS5' could act as supporting access nodes. By this cooperation of access nodes BS3', BS4' and BS5', the radio access rate of mobile station UE1' can become higher than when only communicating with access node BS2'. As can be further seen from table 1, only mobile station UE1' can benefit from handover and cooperation.

Accordingly, access node BS2' sends a handover command to mobile station UE1' triggering that mobile station UE1' provides a handover from access node BS2' to access node BS3'. Furthermore, access node BS2' could inform mobile station UE1' and access nodes BS3', BS4' and BS5' that access node BS3' should be cooperating with access nodes BS4' and BS5' to serve mobile station UE1'. Alternatively, the new serving access node BS3' could determine on its own with which supporting access nodes cooperation could be beneficial.

Further to the above described criteria for initiating a handover, other criteria for determining which mobile stations should handover can be used. For example, mobile stations having the highest gain, mobile stations having the lowest bit rate at the serving access node (when not cooperating), or mobile stations having the highest bit rate at a target access node (when potentially cooperating) may be selected for handover. The serving access node can also select mobile stations generating the highest load on a transport link for a handover.

Figure 4:
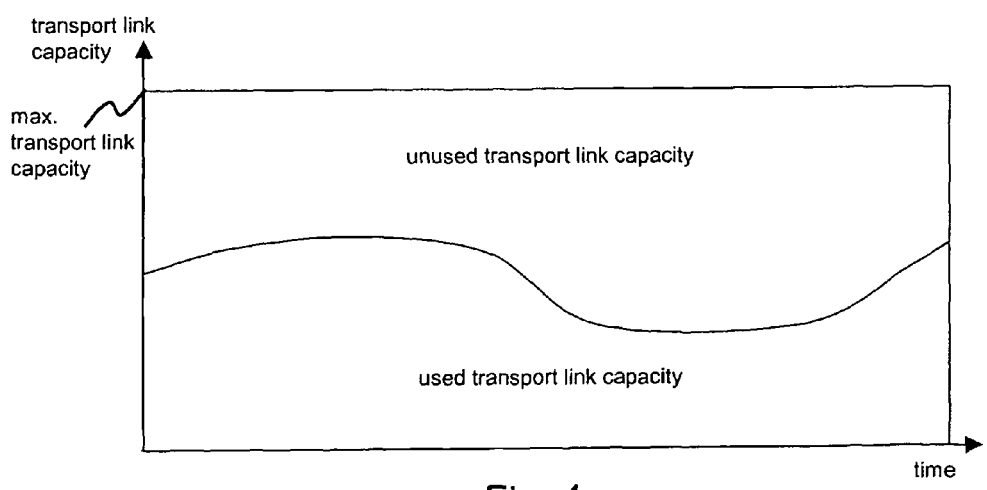
FIG. 4 is a graph showing an exemplary usage distribution of a transport link when no access node cooperation is provided.

FIG. 4 shows an exemplary usage distribution over time of the access node BS3' transport link 308 shown in FIG. 3 when no access node cooperation is provided. The used transport link capacity indicates the amount of data which is transmitted over the transport link 308. The maximum transport link capacity of transport link 308 is limited by its physical structure. As can be seem from FIG. 4, the relation between used and unused transport link capacity varies over time.

Figure 5:
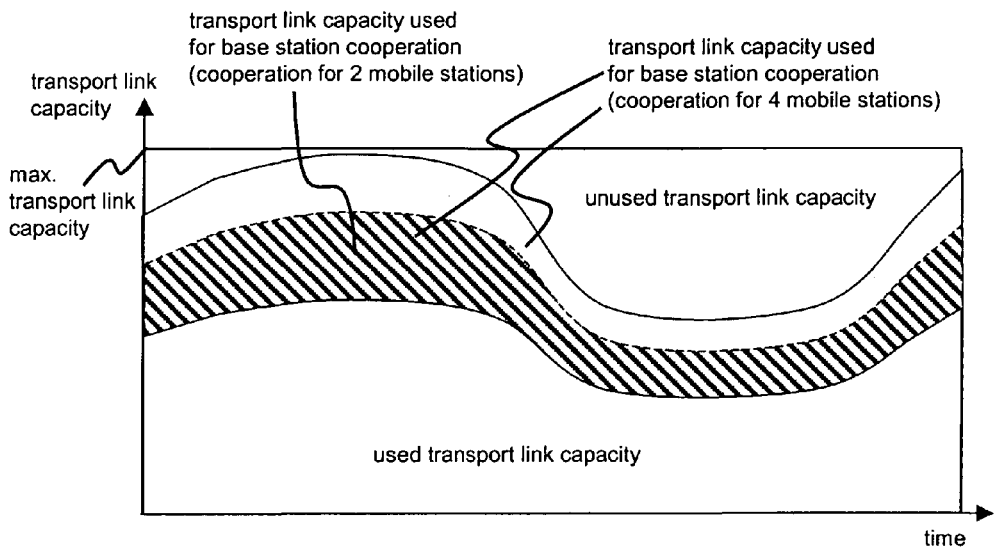
FIG. 5 is a graph showing an exemplary usage distribution of a transport link when access node cooperation is provided.

FIG. 5 shows an exemplary usage distribution over time of the access node BS3' transport link 308 shown in FIG. 3 when access node cooperation is provided. When comparing FIGS. 4 and 5, it can be seen that the more access node cooperation is employed, the better the transport link 308 is utilized (i.e., the less unused transport link capacity is provided). The transport link capacity used for cooperation indicates the amount of user data, control data and data for O&M which is due to access node cooperation transmitted over transport link 308. Accordingly, it can further be seen from FIG. 5 that the more access node cooperation is used for improving the radio access rate of a mobile station, the more transport link capacity is required.

In the following, the influence on an improvement of the radio access rate of a mobile station by the kind of used access node cooperation technique is explained.

Various access node cooperation techniques exist. In one access node cooperation technique, access node cooperation is centrally controlled by a central controller. Another access node cooperation technique is based on a concept of distributed cooperation, whereby access nodes communicate directly via an access node-to-access node interface without central control. For 3GPP LTE mobile communication networks, centralized and decentralized access node cooperation schemes allowing an increase of the carrier and a decrease of the co-channel interference exist.

Figure 6:
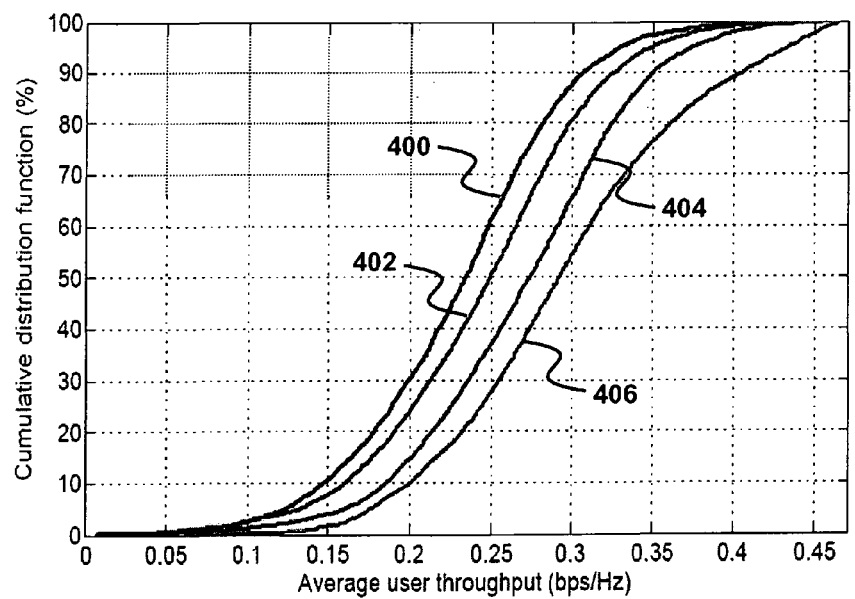
FIG. 6 is a graph showing a cumulative distribution function over an average user throughput for different access node cooperation techniques.

FIG. 6 shows a graph illustrating a cumulative distribution function over an average user throughput for different access node cooperation techniques. In particular, reference number 400 shows the situation when no access node cooperation is provided, reference number 402 relates to a decoded data based access node cooperation technique, reference number 404 relates to a soft bit based access node cooperation technique, and reference number 406 relates to an I/Q data based access node cooperation technique.

The I/Q data based access node cooperation technique 406 provides the highest radio access network capacity. However, in order to enable access node cooperation, a high amount of data has to be exchanged between the cooperating access nodes.

Figure 7:
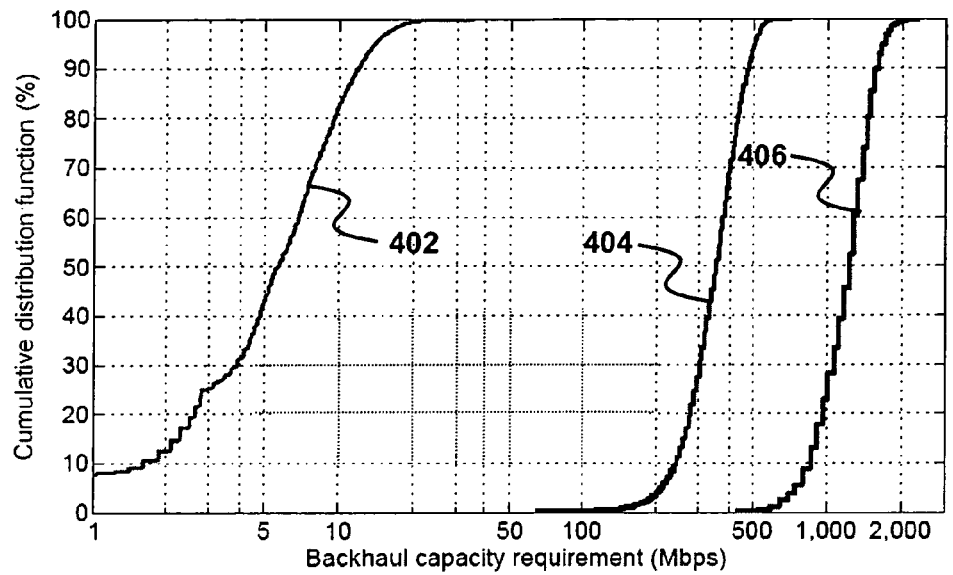
FIG. 7 is a graph showing a cumulative distribution function over a backhaul capacity requirement for the access node cooperation techniques shown in FIG. 6.

FIG. 7 shows a further graph illustrating a cumulative distribution function over a backhaul capacity requirement for the three access node cooperation techniques 402, 404 and 406 shown in FIG. 6. The I/Q data based access node cooperation technique 406 has the highest demand of transport link capacity on the transport link connecting the cooperating access nodes. The decoded data based access node cooperation technique 402 provides the smallest gain, however, it requires only a low amount of transport link capacity on the transport link.

As is apparent from FIGS. 6 and 7, the achievable gain of access node cooperation mainly depends on the amount of data that is exchanged between access nodes or between access nodes and a central controller. Generally speaking, the more information is exchanged between cooperating access nodes, the higher is the increase of the radio access network capacity.

Figure 8:
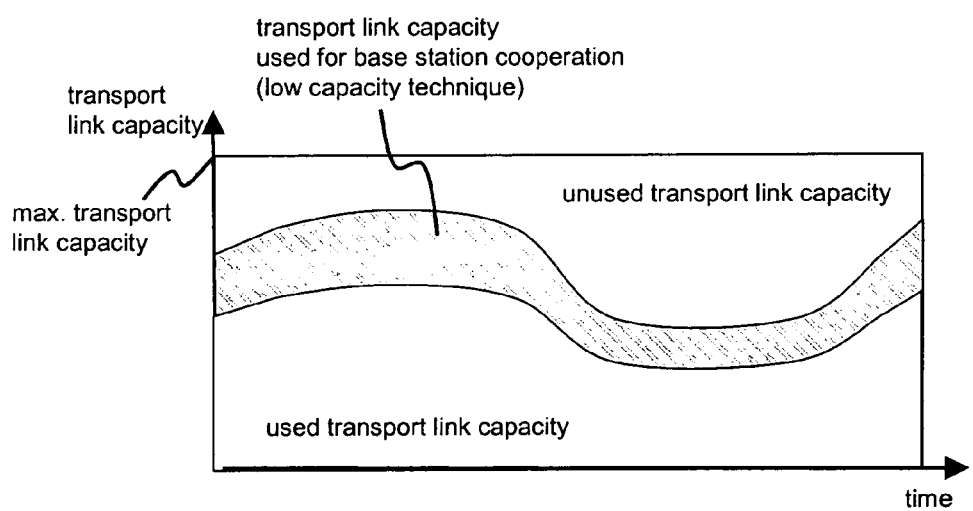
FIG. 8 is a graph showing an exemplary usage distribution of a transport link when an access node cooperation technique requiring low transport link capacity is used.

FIG. 8 shows an exemplary usage distribution over time of the access node BS3' transport link 308 shown in FIG. 3 when an access node cooperation technique requiring low transport link capacity is used. Such an access node cooperation technique can be used when the transport link 308 is a low capacity transport link (e.g., a telephone line made of copper), whereby only a low amount of transport link capacty is required for access node cooperation.

Figure 9:
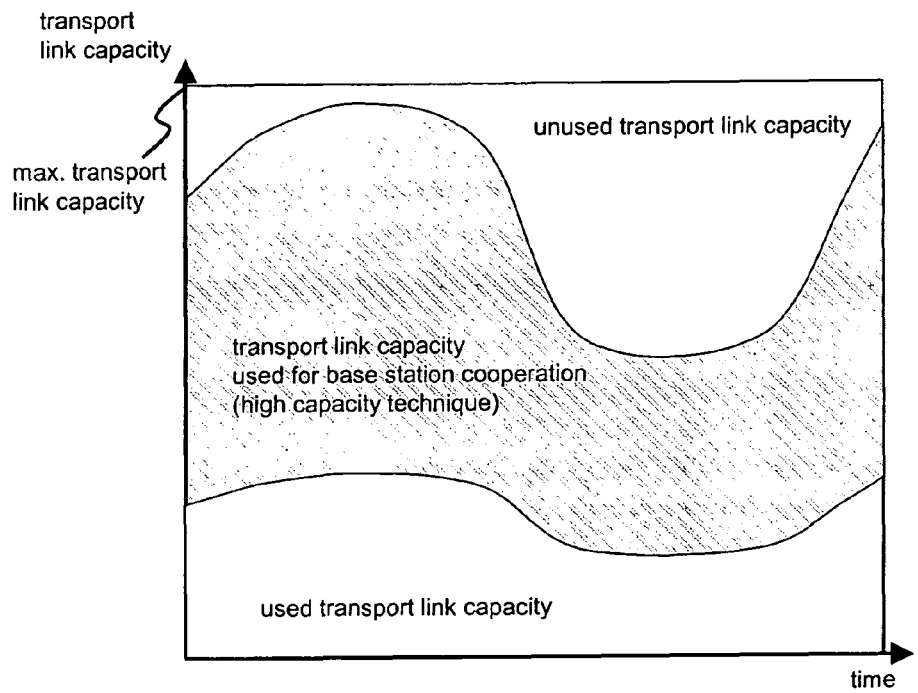
FIG. 9 is a graph showing an exemplary usage distribution of a transport link when an access node cooperation technique requiring high transport link capacity is used.

FIG. 9 shows an exemplary usage distribution over time of the access node BS3' transport link 308 shown in FIG. 3 when an access node cooperation technique requiring high transport link capacity is used. As can be seen, such an access node cooperation technique can be used when the transport link 308 is a high capacity transport link (e.g., a fibre optic link), whereby a high amount of transport link capacity is required for access node cooperation.

From FIGS. 6 to 9, it is apparent that the kind of used access node cooperation technique influences the utilized transport link capacity. Accordingly, the kind of used access node cooperation technology can influence the radio access rate of a mobile station.

Figure 10:
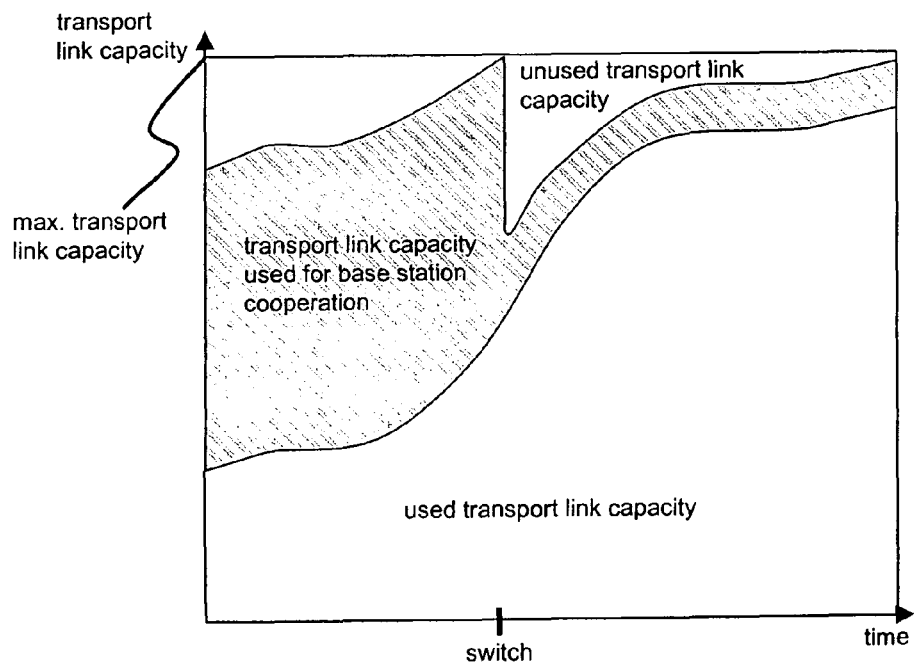
FIG. 10 is a graph showing an exemplary usage distribution of a transport link when access node cooperation techniques are switched.

FIG. 10 shows an exemplary usage distribution over time of the access node BS3' transport link 308 shown in FIG. 3 when the access node cooperation technique is switched. At the indicated point of time, a switch from an access node cooperating technique requiring a high transport link capacity to an access node cooperating technique requiring a low transport link capacity is provided. This switching can be provided during network start-up or during normal network operation. By adaptively switching from the high capacity access node cooperation technique to the low capacity access node cooperation technique, a capacity overload leading to a radio link failure can be prevented. The switching may for example be initiated by a serving access node based on the available backhaul parameters. Thus, by switching the access node cooperation technique, a coarse (i.e., long-term) adaptation of the transport link capacity can be provided.

Figure 11:
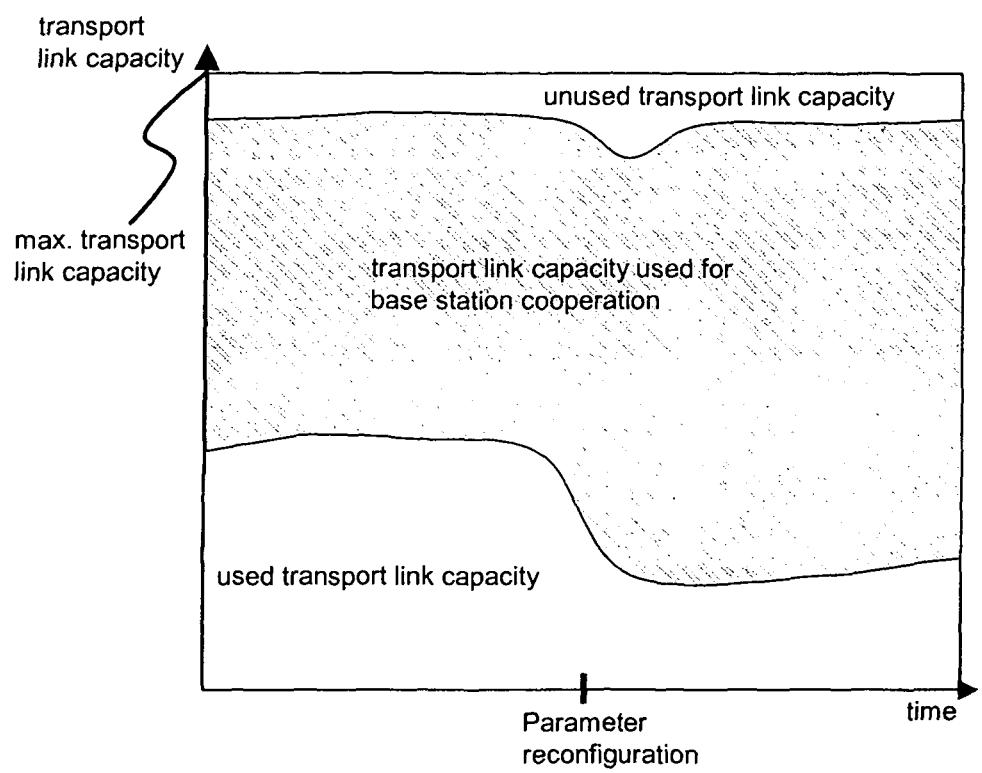
FIG. 11 is a graph showing an exemplary usage distribution of a transport link when parameters of an access node cooperation technique are reconfigured.

FIG. 11 shows an exemplary usage distribution over time of the access node BS3' transport link 308 shown in FIG. 3 when parameters of an access node cooperation technique are reconfigured. By reconfiguring parameters of an access node cooperation technique, the access link capacity and the transport link requirement can be influenced. In particular, it is possible to adapt the parameters of an access node cooperation technique dynamically depending on an unused transport link capacity of a transport link.

An exemplary adjustment parameter for reconfiguring an access node cooperation technique is the threshold of difference in signal quality ($\Delta_{tresh}$) value between serving access nodes and supporting access nodes. Since cooperative transmission is beneficial with regard to the radio access rates of mobile stations when the radio link quality levels of multiple access nodes are similar, mobile stations may measure the signal quality (e.g., the Reference Symbol Receive Power (RSRP)) of the serving access node and at least one supporting access node and send the measurement results to the serving access node. Accordingly, when the condition $$|R_S - R_C| < \Delta_{tresh} \tag{1}$$

is fulfilled, cooperative transmission is beneficial ($R_S$ is the signal strength of the serving access node and $R_c$ is the signal strength of a supporting access node).

By increasing $\Delta_{tresh}$, the number of supporting access nodes (and thus the load on the transport link between the access nodes) increases. Accordingly, by decreasing $\Delta_{tresh}$, the number of supporting access nodes (and thus the load on the transport link between the access nodes) decreases. Thus, depending on the unused transport link capacity, the serving access node may adapt $\Delta_{tresh}$ in order to improve the radio access rate of a served mobile station.

Returning to FIG. 11, due to an increasing amount of available transport link capacity on the transport link, the serving access node reconfigures the parameters of the employed access node cooperation technique (e.g., the serving access node allows more access nodes to participate in the cooperation). Thereby, the transport requirements and the access link capacity increase. Accordingly, it is possible to optimally leverage the backhaul link, whereby a more fine-grained (i.e., short-term) method for access node cooperation control than the method explained with reference to FIG. 10 is provided.

Figure 12:
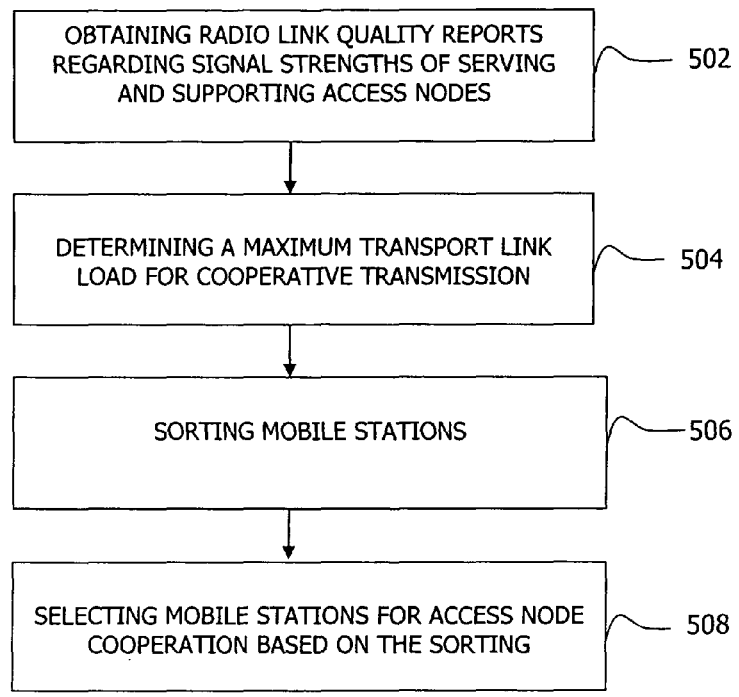
FIG. 12 is a flow chart showing an embodiment of a method for access node cooperation control.

A further fine-grained method embodiment for instructing a mobile station (i.e., access node cooperation control) is explained with reference to flow chart 500 of FIG. 12. The method may be executed by access node BS3' shown in FIG. 3.

In a first step 502, a serving access node receives radio link quality reports regarding the signal strengths of a serving access node and plurality of supporting access nodes. The radio link quality reports are sent from the mobile stations to the serving access node. The mobile stations may be the mobile stations UE1', UE2' and UE3' shown in FIG. 3. Thereafter, in step 504, the maximum transport link load which can be used for cooperative transmission is determined by the serving access node. In a subsequent step 506, candidate mobile stations for cooperative transmission are sorted in accordance with at least one of the following parameters:

- a threshold of difference in signal quality level between the serving access node and a supporting access node, i.e., $|R_S-R_C|$, whereby a low $|R_S-R_C|$ indicates a high potential gain through cooperative transmission;
- a parameter relating to the signal quality of the serving access node (e.g., an absolute value of $R_S$, whereby a high value of $R_S$ indicates good non-cooperative transmission);
- a parameter relating to the QoS and/or the bearer requirements of the mobile station; and
- a parameter relating to a subscriber profile of the mobile station.

In accordance with the sorting provided in step 506, the serving access node selects in step 508 mobile stations for cooperative transmission.

Each specific access node cooperation technique can be configured with certain parameters which are influencing the access link capacity and the transport link requirement. For example, access node cooperating with a plurality of access nodes increases the access link capacity, however, the amount of data exchanged between the cooperating access nodes also increases. By limiting the number of cooperating access nodes, the transport link requirements relax. Other parameters that allow influencing the required transport link capacity on the transport links connecting the access nodes are a selection of the number of mobile stations for which cooperative communication (involving multiple access nodes) is applied. Cooperative communication can also be limited to only certain mobile stations, e.g., mobile stations at the edge of a cell, mobile stations requiring a high radio access rate and/or premium (VIP) users. The received mobile station or access node signal power can also be considered.

In addition to the amount of data that is exchanged to allow for access node cooperation, transport link utilization might increase due to an increased amount of exchanged user data. In case of services whose amount of generated traffic depends on access rates, the amount of user data increases with the available user data rate. For example, rate adaptive video streaming increases the video quality and therewith the amount of generated video traffic in case of high user data rates.

Figure 13:
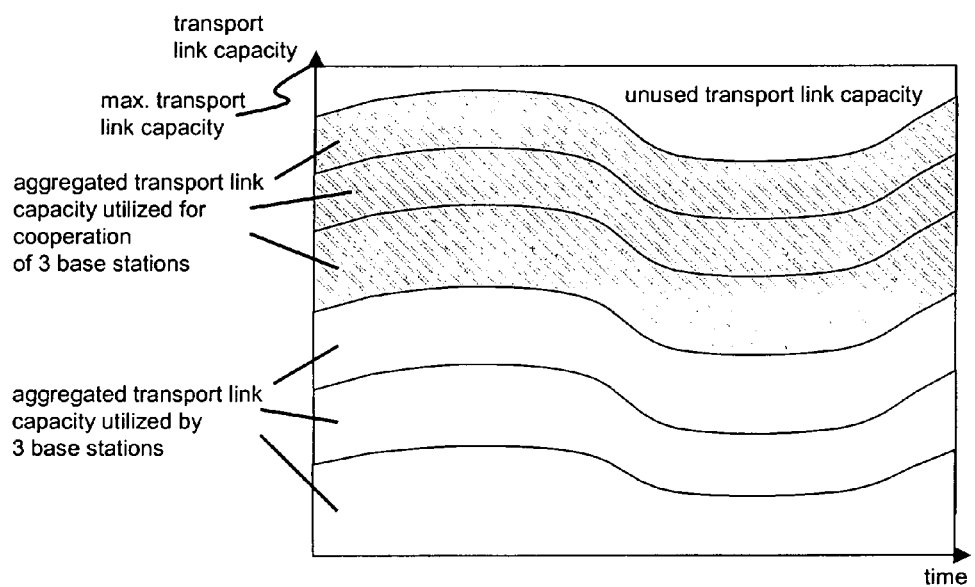
FIG. 13 is a graph showing an exemplary usage distribution of a transport link when several access nodes are connected to a core network via a multihop transport link.

FIG. 13 shows an exemplary usage distribution over time when three access nodes are connected via a multi-hop transport link to a core network. In this case, traffic from three access nodes is aggregated at each hop. Accordingly, the unused transport link capacity is shared among several access nodes. In particular, the transport link capacity of the hop having the highest utilization has to be considered for optimising the radio access rate of the served mobile station.

Figure 14:
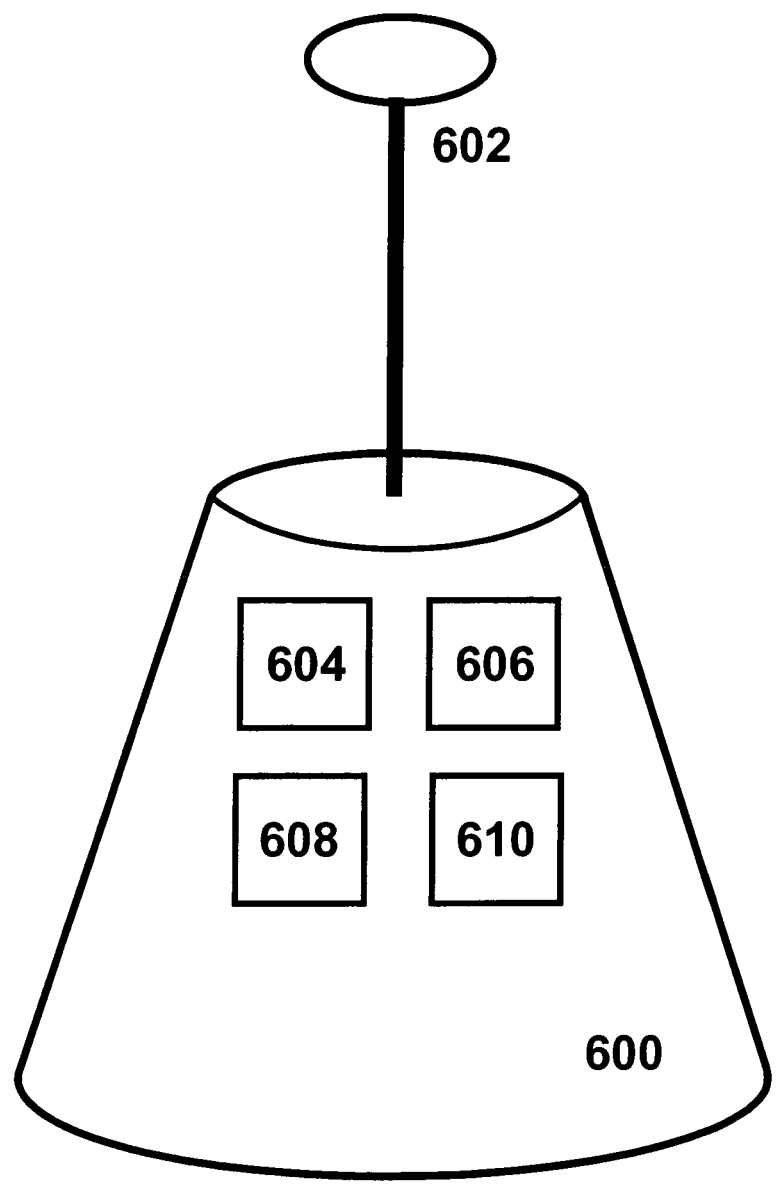
FIG. 14 is a schematic block diagram showing an access node.

FIG. 14 shows an embodiment of an access node 600. The access node may be any of the access nodes BS1, BS2, BS3 shown in FIG. 1 or any of the access nodes BS1', BS2', BS3', BS4', BS5' shown in FIG. 3. In particular, the access node 600 may be a base station or an eNodeB.

Access node 600 is capable of communicating with at least one mobile station and cooperating with a plurality of supporting access nodes. Access node 600 comprises an antenna 602, an obtaining unit 604 for obtaining at least one backhaul parameter relating to a backhaul capacity of at least one of the access node 600 and a supporting access node, a generating unit 606 for generating at least one of a handover command and a system information parameter based on the obtained at least one backhaul parameter, a sending unit 608 for providing the at least one of the handover command and the system information parameter to the at least one mobile station and a comparing unit 610 for comparing the at least one backhaul parameter with a parameter relating to a backhaul capacity of a supporting access node.

The present technique for instructing a mobile station provides an optimization of cooperative transmission and reception in situations when the transport link, i.e., the backhaul transport link, of the serving access node becomes the limiting factor. Thereby, a higher user and cell throughput and a better utilization of transport network capacities can be provided. The present technique for instructing a mobile station further allows automatically setting up a cooperation technique used for newly deployed access nodes depending on the employed transport network technology. The corresponding parameter set of the employed access node cooperation technique can be optimally configured. Moreover, even during network operation, access node cooperation techniques can be changed and/or parameters of a respective access node cooperation technique can be reconfigured, in particular depending on unused transport network capacity. The technique for instructing a mobile station also provides that a maximum radio access network capacity is perceived by served mobile stations. Thus, transport network capacity can always be utilized in an optimal way. The technique may also be beneficial for mobile stations which are located far away from the access node, i.e., so called "cell edger user", and in macro cell deployments having large cell radii.

It is believed that many advantages of the present invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method for instructing at least one mobile station communicating with a serving access node, the serving access node being capable of cooperating with a plurality of supporting access nodes and the at least one mobile station being capable of additionally communicating with the plurality of supporting access nodes such that the serving access node additionally uses the transmission and receiving capacities of at least one of the plurality of supporting access nodes for communicating with the at least one mobile station, the method comprising:
   obtaining at least one backhaul parameter relating to a backhaul capacity of at least one of the serving access node and a supporting access node;
   generating at least one of a handover command and a system information parameter based on the obtained at least one backhaul parameter;
   providing the at least one of the handover command and the system information parameter to the at least one mobile station;
   determining supporting access nodes having a limited free backhaul capacity; and
   excluding the determined supporting access nodes from the additional communication with the at least one mobile station.

2. The method of claim 1, further comprising:
   comparing the at least one backhaul parameter with a parameter relating to a backhaul capacity of a supporting access node; and
   providing the at least one of the handover command and the system information parameter to the at least one mobile station based on the comparison result.

3. The method of claim 1, further comprising:
   determining supporting access nodes which are capable of communicating with the at least one mobile station;
   obtaining the backhaul parameters for the determined supporting access nodes;
   comparing the obtained backhaul parameters; and
   providing the at least one of the handover command and the system information parameter to the at least one mobile station based on the comparison result of the obtained backhaul parameters.

4. The method of claim 1, further comprising:
   obtaining at least one potential radio access rate of the at least one mobile station when at least one of being served by another serving access node and communicating with at least one supporting access node which is cooperating with the serving access node applies;
   obtaining an actual radio access rate of the at least one mobile station;
   comparing the at least one potential radio access rate with the actual radio access rate; and
   providing the at least one of the handover command and the system information parameter to the at least one mobile station based on the comparison result of the at least one potential radio access rate with the actual radio access rate.

5. The method of claim 1, further comprising selecting an access node cooperation technique used by the serving access node based on the at least one backhaul parameter.

6. The method of claim 5, further comprising:
   determining a parameter relating to an unused transport capacity of a transport network connecting the serving access node with at least one supporting access node; and
   selecting the access node cooperation technique based on the determined parameter relating to an unused transport capacity.

7. The method of claim 1, wherein the system information parameter is a threshold value indicating to the at least one mobile station until which difference in signal quality level to camp on the serving access node.

8. The method of claim 1, wherein the system information parameter is a cell status parameter including at least one access category for the at least one mobile station.

9. The method of claim 1, wherein the system information parameter is a threshold value indicating to the at least one mobile station a number of supporting access nodes for the additional communication with the at least one mobile station.

10. The method of claim 1, further comprising:
    receiving at least one first parameter relating to a radio link quality of the serving access node;
    receiving at least one second parameter relating to a radio link quality of at least one supporting access node; and
    providing the at least one of the handover command and the system information parameter to the at least one mobile station based on the received first and second parameters.

11. The method of claim 1, further comprising:
    determining at least one of a parameter relating to a threshold of difference in signal quality between the serving access node and a supporting access node, a parameter relating to the signal quality of the serving access node, a parameter relating to the quality of service of the mobile station, and a parameter relating to a subscriber profile of the mobile station; and
    providing the at least one of the handover command and the system information parameter to the at least one mobile station based on the determined parameters.

12. The method of claim 1, further comprising:
    obtaining backhaul parameters for a plurality of access nodes; and
    providing the at least one of the handover command and the system information parameter to selected ones of the plurality of mobile stations based on the obtained backhaul parameters.

13. The method of claim 1, wherein a hysteresis margin is taken into consideration for the providing of the at least one of the handover command and the system information parameter to the at least one mobile station.

14. The method of claim 1, further comprising adding a safety margin to the at least one backhaul parameter.

15. A computer program with program code portions executed on one or more computing devices, the computer program capable of instructing at least one mobile station communicating with a serving access node, the serving access node being capable of cooperating with a plurality of supporting access nodes and the at least one mobile station being capable of additionally communicating with the plurality of supporting access nodes such that the serving access node additionally uses the transmission and receiving capacities of at least one of the plurality of supporting access nodes for communicating with the at least one mobile station, the computer program capable of performing the following:

obtaining at least one backhaul parameter relating to a backhaul capacity of at least one of the serving access node and a supporting access node;

generating at least one of a handover command and a system information parameter based on the obtained at least one backhaul parameter;

providing the at least one of the handover command and the system information parameter to the at least one mobile station;

determining supporting access nodes having a limited free backhaul capacity; and excluding the determined supporting access nodes from the additional communication with the at least one mobile station.

16. The computer program of claim 15, wherein said computer program is stored on a computer-readable recording medium.

17. An access node which is capable of communicating with at least one mobile station and cooperating with a plurality of supporting access nodes which are capable of additionally communicating with the at least one mobile station such that the access node additionally uses the transmission and receiving capacities of at least one of the plurality of supporting access nodes for communicating with the at least one mobile station, the access node comprising:

an obtaining unit for obtaining at least one backhaul parameter relating to a backhaul capacity of at least one of the access node and a supporting access node;

a generating unit for generating at least one of a handover command and a system information parameter based on the obtained at least one backhaul parameter; and a sending unit for providing the at least one of the handover command and the system information parameter to the at least one mobile station;

wherein the access node is configured to:
 determine supporting access nodes having a limited free backhaul capacity; and
 exclude the determined supporting access nodes from the additional communication with the at least one mobile station.

18. The access node of claim 17, further comprising a comparing unit for comparing the at least one backhaul parameter with a parameter relating to a backhaul capacity of a supporting access node.

19. A mobile communication network comprising:

an access node which is capable of communicating with at least one mobile station and cooperating with a plurality of supporting access nodes which are capable of additionally communicating with the at least one mobile station such that the access node additionally uses the transmission and receiving capacities of at least one of the plurality of supporting access nodes for communicating with the at least one mobile station, the access node comprising:

an obtaining unit for obtaining at least one backhaul parameter relating to a backhaul capacity of at least one of the access node and a supporting access node;

a generating unit for generating at least one of a handover command and a system information parameter based on the obtained at least one backhaul parameter; and a sending unit for providing the at least one of the handover command and the system information parameter to the at least one mobile station;

wherein the access node is configured to:
 determine supporting access nodes having a limited free back-haul capacity; and
 exclude the determined supporting access nodes from the additional communication with the at least one mobile station; and at least one supporting access node which is capable of cooperating with the at least one access node.

* * * * *

UNITED STATES PATENT AND TRADEMARK OFFICE
CERTIFICATE OF CORRECTION

| | | |
|---|---|---|
| PATENT NO. | : 8,825,053 B2 | Page 1 of 1 |
| APPLICATION NO. | : 13/319889 | |
| DATED | : September 2, 2014 | |
| INVENTOR(S) | : Sachs et al. | |

It is certified that error appears in the above-identified patent and that said Letters Patent is hereby corrected as shown below:

In the Specification

In Column 1, Line 8, delete "with to" and insert -- with --, therefor.

In Column 12, Line 10, delete "capacty" and insert -- capacity --, therefor.

Signed and Sealed this
Twenty-eighth Day of April, 2015

Michelle K. Lee
*Director of the United States Patent and Trademark Office*